United States Patent
Kuhr

(10) Patent No.: US 8,452,741 B1
(45) Date of Patent: May 28, 2013

(54) RECONCILING DATA RETENTION REQUIREMENTS

(75) Inventor: Gernot Kuhr, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/405,754

(22) Filed: Feb. 27, 2012

(51) Int. Cl.
G06F 17/30 (2006.01)

(52) U.S. Cl.
CPC .................. *G06F 17/30085* (2013.01)
USPC .......................................... 707/694; 707/662

(58) Field of Classification Search
None
See application file for complete search history.

(56) References Cited

U.S. PATENT DOCUMENTS

| | | | | |
|---|---|---|---|---|
| 7,594,082 B1 * | 9/2009 | Kilday et al. | ................. | 711/154 |
| 7,716,191 B2 * | 5/2010 | Blumenau et al. | ............ | 709/206 |
| 7,805,472 B2 * | 9/2010 | DeBie | ........................... | 707/829 |
| 8,073,911 B2 * | 12/2011 | Marston et al. | ............... | 709/206 |
| 2007/0239715 A1 * | 10/2007 | DeBie | ............................... | 707/6 |
| 2007/0271308 A1 * | 11/2007 | Bentley et al. | ................ | 707/200 |
| 2008/0263112 A1 * | 10/2008 | Shaath et al. | ................. | 707/204 |

FOREIGN PATENT DOCUMENTS

WO   WO 2012118512 A1 *   9/2012

OTHER PUBLICATIONS

"SAP Help Portal-Evaluating Retention Rules, ERP2005 EHP05", http://help.sap.com/erp2005_ehp_05/helpdata/en/8b/7c0e2880e54effbf10426d087f7a01/content.htm, Jun. 2010.*

* cited by examiner

*Primary Examiner* — Tony Mahmoudi
*Assistant Examiner* — Umar Mian
(74) *Attorney, Agent, or Firm* — Kenyon & Kenyon LLP

(57) ABSTRACT

Data retention requirement rules may be created to have an area association, a minimum retention period specification, and a maximum retention period specification associated with one or more rules. Users may be assigned to one or more areas of at least one rule. Data objects may associated with one or more areas that may be associated with a rule. As the rules are updated and/or changed, the minimum and maximum periods in different rules may be compared in real time to implement a data retention policy that automatically deletes, preserves, and/or prevents access to data objects according to the each of the rules.

19 Claims, 5 Drawing Sheets

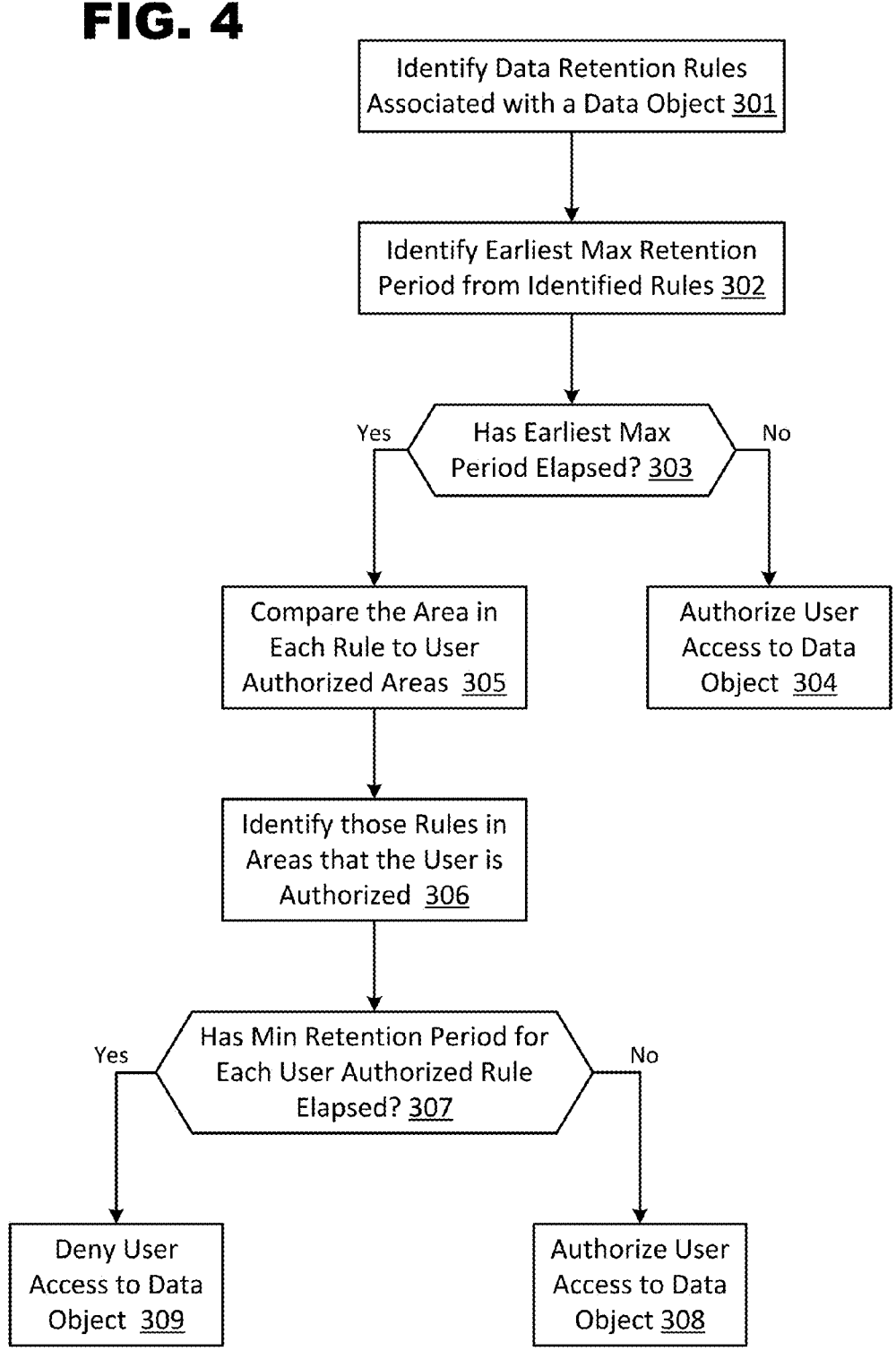

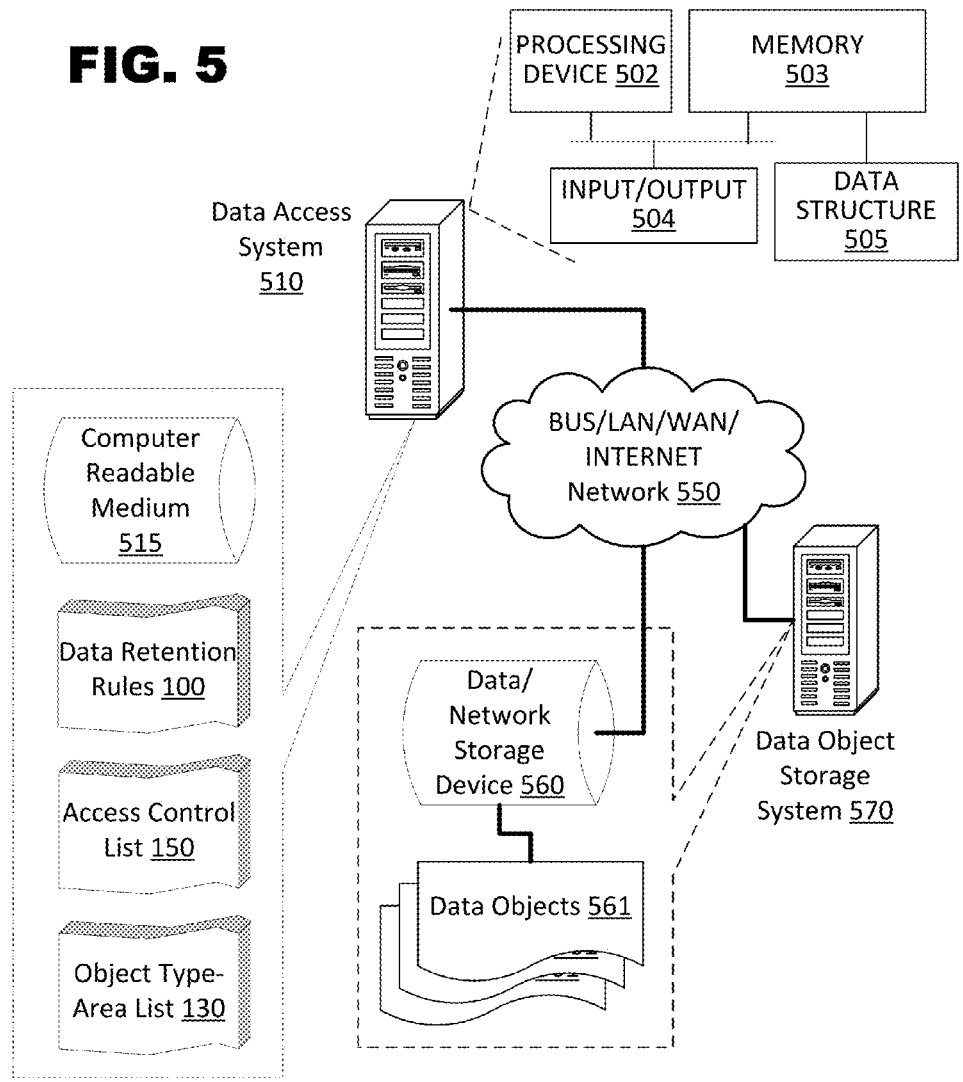

RECONCILING DATA RETENTION REQUIREMENTS

BACKGROUND

Many organizations store customer, sales, product, and other data electronically. As the amount and types of data that are stored electronically has increased, new data retention regulations and policies have also been implemented and are continuing to be implemented. For example, some governments have implemented or are considering implementing data retention regulations relating to privacy issues that may require organizations to ensure that certain information is deleted within a particular time frame. If deletion is not possible because of other data retention regulation requiring the data to be retained for longer periods, then access to the data must be restricted to only those in the organization with a need to access the information until the data may be deleted. Aside from data privacy regulations, some governments have also enacted other types of data retention regulations requiring organizations to retain certain information, such as tax-related information or production liability information for a certain minimum time period in the event of an audit or other proceeding.

Implementation issues may arise, especially with respect to existing electronically stored information, when these new data retention regulations are enacted. For example, new privacy legislation requiring all customer data to be deleted within two years of being entered unless the data is otherwise required to be preserved by regulation, may required to first identify all customer data, then identify which of the customer data is required to be preserved by other regulations, and then designate the customer data that does not need to be preserved for deletion within the two year period. This process may be extremely time consuming and inefficient.

Additionally, if subsequently enacted legislation later required certain types of customer data to be preserved for longer periods, the customer data would have to be rechecked so that these new types of customer data are not deleted within the two-year window. As more legislation, regulations, and policies get enacted over time, it becomes even more difficult and inefficient to ensure that the data is preserved in compliance with each of the regulations. As the complexity of implementing subsequent regulations increases, it also becomes more likely that certain data will either be inadvertently deleted prematurely or inadvertently retain too long, which may cause future problems for the organization.

There is a need for a data retention framework enabling an automatic implementation and reconciliation of new retention rules with existing retention rules and data.

BRIEF DESCRIPTION OF THE DRAWINGS

FIG. 4 shows a second exemplary process.

FIG. 5 shows an exemplary architecture.

DETAILED DESCRIPTION

Figure 1:
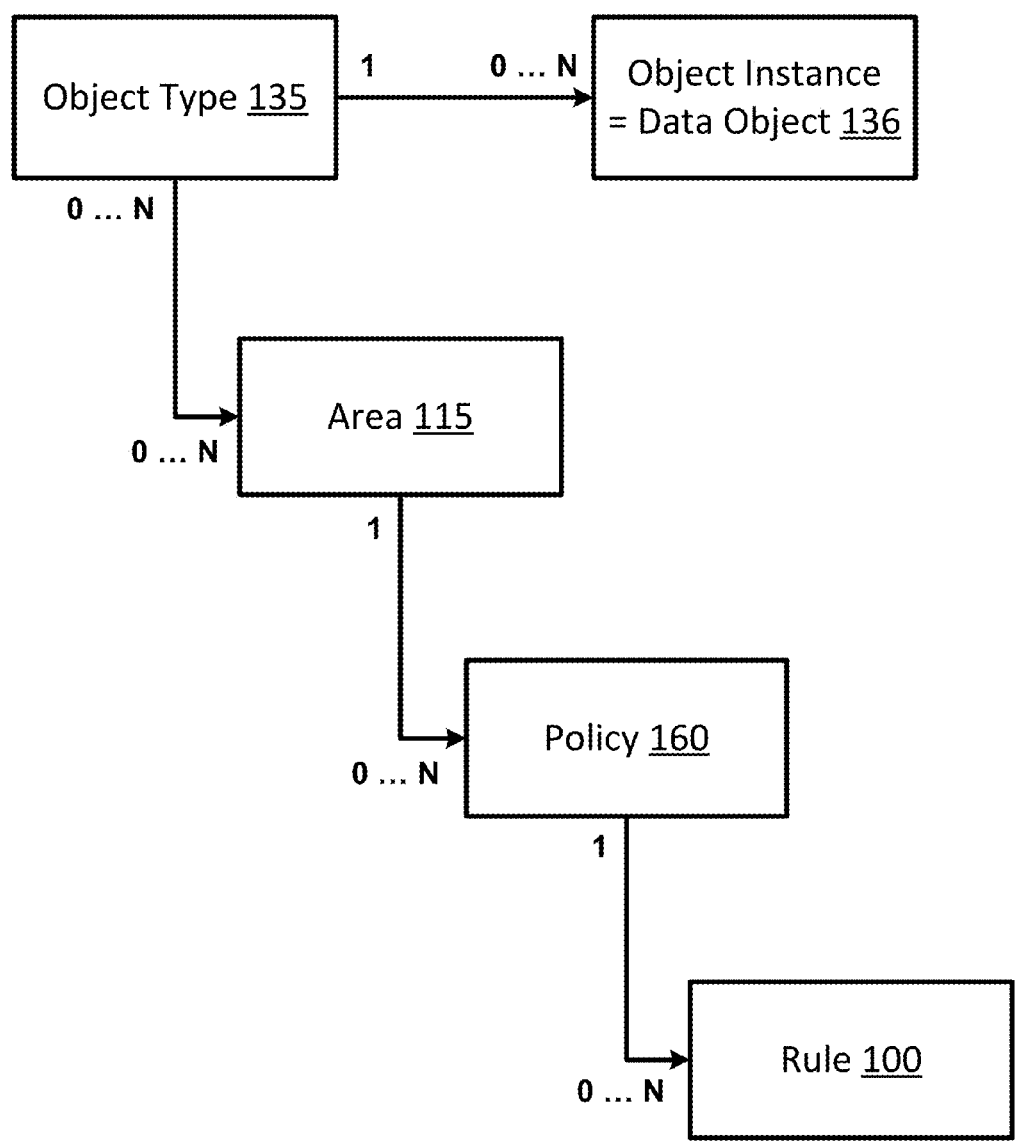
FIG. 1 shows an exemplary organization of object types, areas, policies, and rules.

In an embodiment, each rule relating to data retention may have at least three fields associated with it—a set of conditions fields, a minimum retention period field, and a maximum retention period field. Each rule may be associated with one or more policies, areas, and object types in a hierarchical manner. A policy may cover a particular set of rules in a given area. For example, a tax audit policy may cover a set of rules relating to tax audits. An area may identify a business area to which one or more policies or rules relate. For example, a tax area may include the tax audit policy and other tax related policies or rules.

A minimum retention period field may identify a minimum amount of time specified by the rule that data objects for this object type in the area specified are to be retained before becoming eligible for deletion. A maximum retention period field may identify a maximum amount of time specified by the rule that data objects in the area associated with the rule may be retained by the organization before they must be deleted, absent another regulation, policy, or rule requiring that the data be preserved for a longer period. As previously discussed, the area field may identify an area to which the rule relates. For example, if a new data retention rule is passed relating to preservation of data for tax audits, the rule may be assigned to the area TAX.

The area field may include an identifier corresponding to a data classification used by the organization's computing systems. For example, if the organization's computing systems classify all tax relevant data objects with an identifier TAX_REL, then the area field may also include this identifier for rules pertaining to tax relevant information. Similarly, if the organization's computing system use several different identifiers for classifying tax relevant data objects, then the area field may include each of these several identifiers.

Alternatively, the area field may include another identifier. An external data source, such as a database, lookup table, or set of links, may include one or more associations between the identifier and one or more data objects stored in the organization's computing systems. The external data source may also include one or more associations between the identifier and different users indicating that the users are authorized to access data associated with the identifier.

The minimum and maximum retention period fields may include a unit of time identifier specifying a unit of time of each period. The unit of time may be any unit of time, including, but not limited to, hours, days, months, quarters, and years. In some instances, the minimum and maximum retention periods may start to run and begin to elapse once a data object containing data associated with the rule is created, last changed, or last accessed. In other instances, the retention periods may start to run based on other events or based on data entered into other fields, such as a receipt of payment, a delivery of goods, a retirement or termination of an employee, and so on. A time factor relevance field may specify the particular criteria that cause these periods to run and begin to elapse. In some configurations, the minimum and maximum retention periods may be reset when the data object is updated so that the periods begin elapsing at the time the data object is updated.

A time factor offset field may also be provided for a rule. The time factor offset field may specify an amount of time to wait before the minimum and maximum retention periods begin to run once the criteria in the time factor relevance field is satisfied. For example, the time factor offset field data may specify that the retention period is to start at an end of a year or end of a quarter. In this case, instead of the processing device otherwise immediately triggering the retention period of a particular data object to begin elapsing according a rule, the processing device may instead wait until the end of the year or end of the quarter before permitting the retention period to start running.

Thus, offset field may specify an amount of time to postpone a start of the minimum and/or maximum retention periods associated with that particular rule. In some situations, a period may start or end in middle of a cycle. For example, if a period is designated to be one month long, and actually starts on July 30, then the period may be scheduled to end on August 30. However, the next month cycle may not begin until September 1. In these situations, the period may be configured to automatically extend until next month cycle begins on September 1. Thus, in some situations, each period may not elapse until a start of a next unit of time after a scheduled end of the respective period.

In some situations, organizations may prefer to have data deleted as soon as possible, so that the data is retained only for any required minimum retention period. In these situations, the minimum retention period fields in the rules having area fields associated with a particular data object may be compared, and the latest end of the minimum retention periods for each data object may be identified. Each data object may be deleted as soon as its identified latest end of the minimum retention periods elapses.

FIG. 1 shows an exemplary hierarchical organization of object types, areas, policies, and rules. Each object type 135 in a program or application may have one or more instances or data objects 136 associated with the object type 135. Different object types 135 may also be associated with different business areas 115. Each object type 135 may, but need not, be associated with one or more areas 115 and each area 115 may, but need not, be associated with one object types 135. Each area 115 may have one or more policies 160 or rules 100 associated with the area 115. For example, a tax area 115 may have a tax audit policy 160 and/or one or more tax rules 100 associated with the tax area 115. Each policy 160 may have one or more rules 100 associated with the policy 160.

Figure 2:
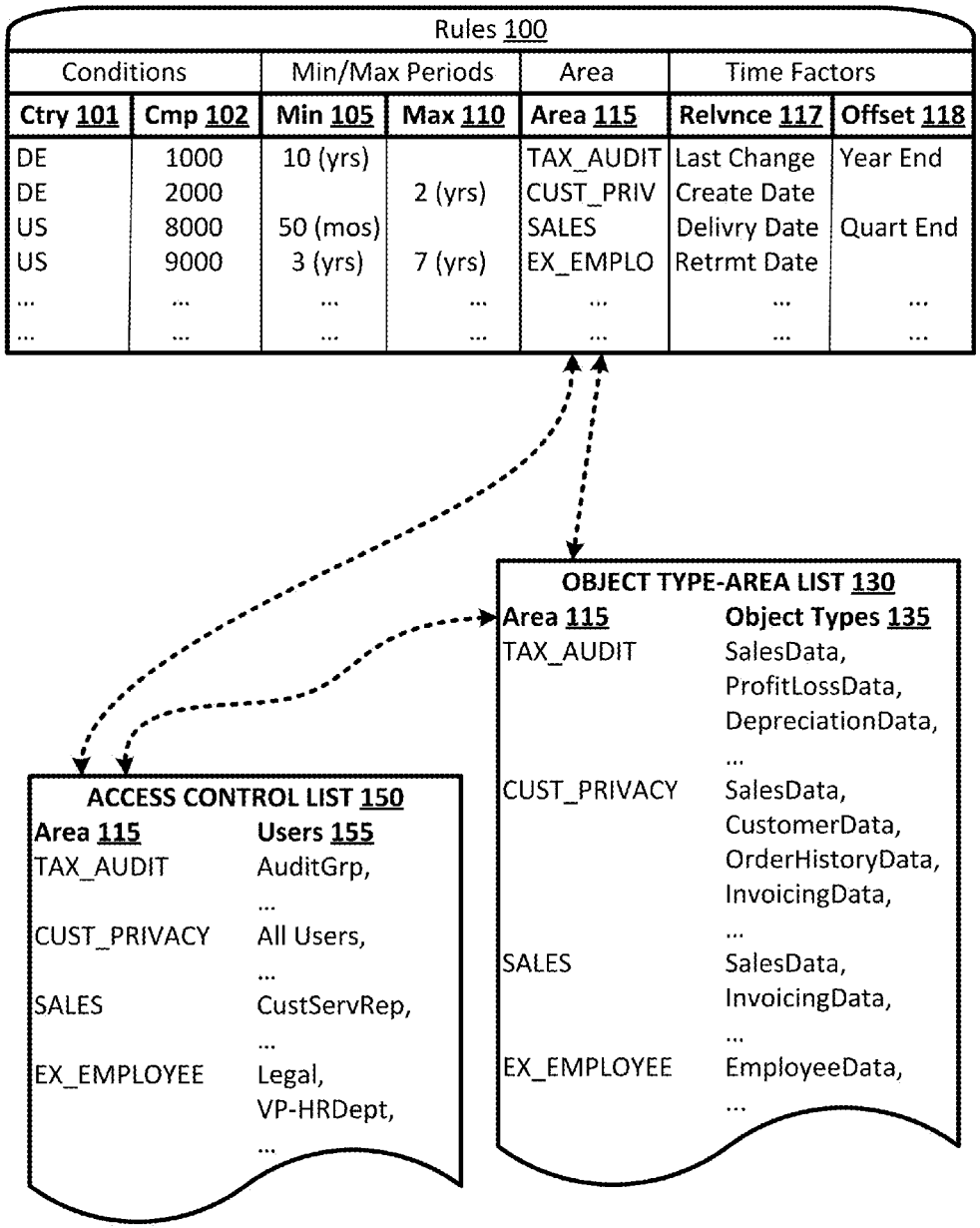
FIG. 2 shows an exemplary configuration of a set of data retention rules.

FIG. 2 shows an exemplary configuration of a set of data retention rules 100. Each rule 100 may include a set of condition fields 101 and 102, minimum and maximum retention fields 105 and 110, and time factor fields 117 and 118. The country field 101 may identify a country, such as Germany or the United States, to which the rule applies. The company code field 102 may identify a corporate entity, such as a parent or subsidiary, to which the rule applies. These fields 101 and 102 may be used by organizations to ensure compliance with specific regulations in each geographic region in which the organizations conducts business.

Each rule 100 be associated with a particular policy 160 and/or area 115 to which the rules applies. For example, the first rule with company code "1000" may be a tax auditing rule assigned to the TAX_AUDIT area, the second rule with company code "2000" may be a customer privacy rule assigned to the CUST_PRIVACY area, the third rule with company code "8000" may be a sales data rule assigned to the SALES area, and the fourth rule with company code "9000" may be a rule relating to data associated with former employees assigned to the EX_EMPLOYEE area.

Each of these rules may specify at least one of a minimum data retention period 105 or a maximum data retention period 110, for data associated with the rule 100. Each of the data retention period fields 105 and 110 may include a unit of time identifier specifying a unit of time of each period. In some instances, one or more rules 100 may also include an offset period field 118 specifying an amount of time to postpone a start of each period associated with the rule. In some instances, each of the rules 100 may only specify and provide for two time periods—a minimum and a max retention period through respective fields 105 and 110. In some instances, one or more rules may also include a time factor relevance field 117, which may specify a particular event, such a last data change time, a data object creation time, and so on, that triggers a start or resetting of the minimum and maximum retention periods. In some instances, each of the rules 100 may include only a set of condition fields (such as country field 101 and company code field 102), a minimum retention period field 105, a maximum retention period field 110, a time factor relevance field 117, and an offset field 118.

Other data sources, such as an access control list 150 and/or a object type-area list 130, may included associations between areas 115 (and/or policies 160) and those users 155 involved in the area 115 or object types 135 that include data pertaining to the area. For example, the users 155 assigned to the auditing group AuditGrp may be involved or perform audit related tasks in the TAX_AUDIT area 115. Associating these auditing group users 155 with the TAX_AUDIT area 115 may ensure that they are able to access the data object types 135 in the data object type-area list 130 associated with the TAX_AUDIT area 115, such as the SalesData, ProfitLossData, DepreciationData objects for at least the ten year period 105 specified in the TAX_AUDIT rule 100.

In the case of customer privacy rule in the CUST_PRIVACY area 115 which is assigned to All Users 155 in the access control list 150, all of the users 155 may have access to the SalesData, CustomerData, OrderHistoryData, and InvoicingData object types 135 for a maximum period 110 of two years. After the two year period, each of the relevant objects associated with the object types SalesData, CustomerData, OrderHistoryData, and InvoicingData may be then deleted unless another rule requires them to be preserved for a longer period.

In FIG. 2, however, the TAX_AUDIT area rule 100 indicates that the SalesData object types 135 are to be retained for a minimum period of ten years. Additionally, the SALES area rule 100 indicates that SalesData and InvoicingData object types 135 are to be retained for a minimum period of fifty months. Since the CustomerData and OrderHistoryData objects 135 are not required by the other listed rules 100 to be retained for a longer period, the CustomerData and OrderHistoryData objects are deleted at the end of the two year period 110 specified in the CUST_PRIVACY area rule 100.

Since the InvoicingData objects are required to be retained by the SALES area rule 100 for a minimum period 105 of fifty months, the InvoicingData objects are retained for the fifty month period and then deleted at the end of the fifty month period due to the rule in the CUST_PRIVACY area. However, because the CUST_PRIVACY area rule 100 indicates that the object should be deleted after two years which is not possible due to the retention obligation of the rule in the SALES area, access to the InvoicingData objects are restricted so that only those with a business need to access the InvoicingData objects may do so between the end of two year period 110 in the CUST_PRIVACY area rule 100 and the deletion of the InvoicingData objects at the end of the fifty month period 105 in the SALES area rule 100. The access control list 150, may be used to ensure that only those users 155 assigned to the SALES area 115, such as users in the customer service representative CustServRep group, may access the InvoicingData objects after the two year period 110 and until the fifty month period 105 when the InvoicingData objects are deleted.

The SalesData objects are associated with both the TAX_AUDIT and SALES areas 115. The TAX_AUDIT area rule 100 requires the SalesData object types 135 to be retained for a minimum period 105 of ten years, while the SALES area rule 100 requires the SalesData object types 135 to be retained for a minimum period 105 of fifty months. Thus, the Sales- Data objects may not be deleted until at least the end of the ten year period 105 specified in the TAX_AUDIT area rule 100. However, because the CUST_PRIVACY area rule 100 indicates that the SalesData object types 135 should be deleted after two years, access to the SalesData objects may be restricted so that only those with a business need to access the SalesData objects may do so between the end of two year period 110 in the CUST_PRIVACY area rule 100 and the deletion of the SalesData objects at the end of the ten year period 105 in the TAX_AUDIT area rule 100.

The access control list 150, may be used to ensure that only those users 155 assigned to either the SALES area 115 or the TAX_AUDIT area 115, may access the SalesData objects after the two year period 110 and until the end of the fifty month minimum retention period 105 in the SALES area rule 100. The access control list 150, may also be used to ensure that only those users 155 assigned to the TAX_AUDIT area 115 may access the SalesData objects after the end of the fifty month minimum retention period 105 in the SALES area rule 100 and until the end of the ten year minimum retention period 105 in the TAX_AUDIT area rule 100.

Figure 3:
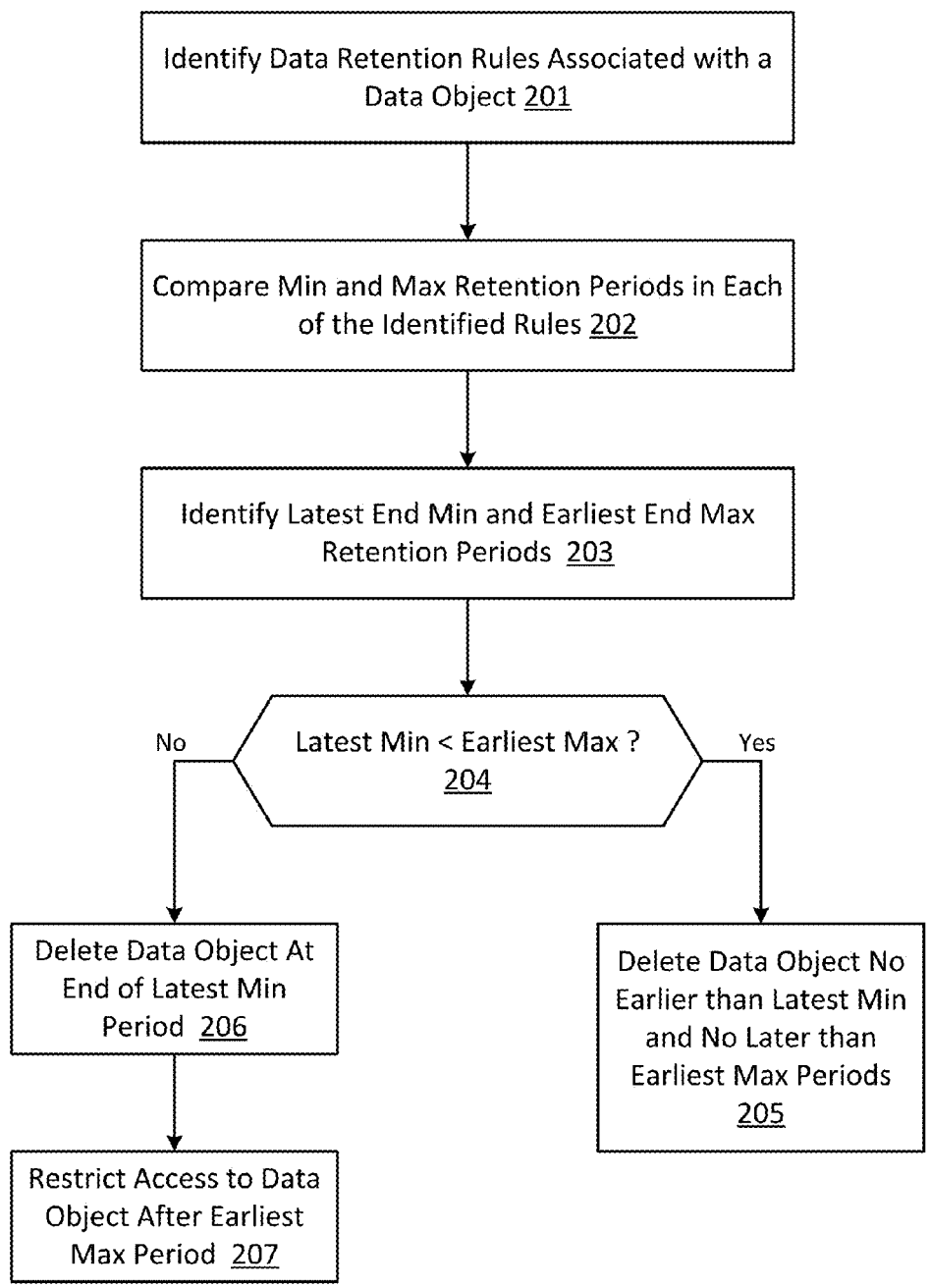
FIG. 3 shows a first exemplary process.

FIG. 3 shows a first exemplary process. Instructions for executing this process may be stored in a non-transitory computer readable medium. When the stored instructions are executed by a processing device, they made instruct the processing device to execute the process.

In box 201, one or more data retention rules associated with a particular data object may be identified. Each of the rules may specify an area to which the rule applies and may also specify at least one of a minimum data retention period and a maximum data retention period of data associated with the specified area to which the rule applies. An external data source, such as a list, database, lookup table, or other data source may provide an association or link between one or more data objects and one or more of the areas to which a rule may apply.

In box 202, the minimum and the maximum retention periods in each of the identified data retention rules may be compared to each other.

In box 203, a latest end of the minimum retention periods and an earliest end of the maximum retention periods may be identified from the comparing.

In box 204, a decision may be made as to whether the identified latest end of the minimum retention periods is less than the earliest end of the maximum retention periods.

In box 205, if the latest end of the minimum retention periods is less than the earliest end of the maximum retention periods, the data object may be deleted no earlier than a latest end of the minimum retention periods and no later than an earliest end of the maximum retention periods. In some instances the data object may be deleted at the latest end of the minimum retention periods, though in other instances the data object may be deleted at the earliest end of the maximum retention periods.

In box 206, if the latest end of the minimum retention periods is not less than the earliest end of the maximum retention periods, the data object may be deleted at a latest end of the minimum retention periods. In some instances, when the latest end of the minimum retention periods is greater than the earliest end of the maximum retention periods, a subset of rules associated with the data object that have a maximum retention period less than the latest end of the minimum retention periods may be identified. Thereafter, access to the data object may be restricted to only those authorized to access the data object. For example, those users assigned to an area specified in each rule in the identified subset may be prevented from accessing the data object after the maximum retention period in the respective rule.

In box 207, access to the data object at and/or after an earliest end of the maximum retention periods may be prevented so that unauthorized users can no longer access the data object. Access to the data object may be prevented in some instances after the maximum retention period, unless a user is assigned to an area having an identified rule with a minimum retention period that has not elapsed. In this case, access to the data object may continue until the minimum retention period has elapsed, at which time access to the data object may be prevented and/or the data object may be deleted. In general, data objects are deleted when the maximum retention period has elapsed, unless there are other rules applicable to the data object whose minimum retention period has not elapsed. In this case the data object is not deleted before the latest end of the minimum retention periods and is then deleted immediately when the latest end of the minimum retention periods is reached. If the user is assigned to or has otherwise been granted authorization to access an area having a rule with minimum retention period that has not yet elapsed, then the user may be granted authorization to access the data object. Otherwise, access may be denied.

FIG. 4 shows a second exemplary process. In box 301, one or more data retention rules associated with a particular data object may be identified. Instructions for executing this process may be stored in a non-transitory computer readable medium. When the stored instructions are executed by a processing device, they made instruct the processing device to execute the process.

In box 301, one or more data retention rules associated with a particular data object may be identified. Each of the rules may specify an area to which the rule applies and may also specify at least one of a minimum data retention period and a maximum data retention period of data associated with the specified area to which the rule applies. A data source, such as a list, database, lookup table, or other data source may provide an association or link between one or more data objects and one or more of the areas to which a rule may apply.

In box 302, the maximum retention period in each of the identified rules may be compared and a earliest end of the maximum retention periods in the identified rules may be identified.

In box 303, a decision may be made as to whether the earliest end of the maximum retention periods has elapsed.

In box 304, if the earliest end of the maximum retention periods has not elapsed, user access to the data object may be granted.

In box 305, if the earliest end of the maximum retention periods has elapsed, the area specified in each identified rule may be compared to a list of areas authorized for the user attempting to access the data object.

In box 306, a subset of the identified rules that specify particular areas that the user is authorized to access may be identified.

In box 307, a decision may be made as to whether at least one of identified subset of rules also specifies a minimum retention period that has not yet elapsed.

In box 308, if the decision indicates that at least one of identified subset of rules also specifies a minimum retention period that has not yet elapsed, user access to the data object may be granted.

In box 309, if the decision does not indicate that at least one of identified subset of rules also specifies a minimum retention period that has not yet elapsed, user access to the data object may be denied.

In some instances, user access to the data objects may be denied by default unless specific access is otherwise authorized or granted by the above process. In some instances, the above process may be repeated each time an attempt is made to access a data object.

FIG. 5 shows an exemplary architecture. Data access system 510 may include a computer readable medium 515 storing data that may include a set of data retention rules 100, an access control list 150, and/or an object type-area list 130. In some instances, the access control list 150, and/or an object type-area list 130 may be stored in a table, database, or other data structure that is separate from the computer readable medium 515 and/or the data access system 510.

Data access system 510 may be connected to a network 550. Network 550 may include a LAN, WAN, bus, or the Internet. Data access system 510 may interface with other systems and components depending on the application. For example, a network/data storage device 560 may be used to store the different types of data structures, including different object types 135, data objects, and data that is used by the organization. The storage device 560 may be a part of a data object storage system 570.

In some embodiments the network storage device 560 may also be separate from the data object storage system 570 but connected to it through network 550. The storage device 560 may contain a hard disk drive, flash memory, or other computer readable media capable of storing data. Other external systems and data sources may also be connected to network 550. These other systems may be used to supply additional data or information used by the data access system 510, such as, for example, access control or data object-area tables.

Each of the systems, clients, and devices in FIG. 5 may contain a processing device 502, memory 503 storing loaded data or a loaded data structure 505, and an communications device 504, all of which may be interconnected via a system bus. In various embodiments, each of the systems 510 and 570 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the data access system 510 is shown as a separate system from the data object storage system 570, in some instances the data object storage system 570 and the data access system 510 may be functionally integrated into a single system.

We claim:

1. A method comprising:
identifying a plurality of data retention rules associated with a data object, each rule specifying an area to which the rule applies and at least one of a minimum retention period and a maximum retention period;
comparing the minimum and the maximum retention periods in each of the identified data retention rules;
identifying a latest end of the minimum retention periods and an earliest end of the maximum retention periods from the comparing;
if the latest end of the minimum retention periods is less than the earliest end of the maximum retention periods, deleting the data object no earlier than the latest end of the minimum retention periods and no later than the earliest end of the maximum retention periods; and
otherwise, if the latest end of the minimum retention periods is not less than the earliest end of the maximum retention periods:
granting access to the data object for users granted authorization to access an area having a rule associated with the data object with a minimum retention period that has not yet elapsed when the maximum retention period in each respective rule is reached until the latest end of the minimum retention periods is reached;
otherwise denying access to the data object when the maximum retention period in each respective rule is reached until the latest end of the minimum retention periods is reached; and
deleting the data object at the latest end of the minimum retention periods.

2. The method of claim 1, further comprising, for each rule having a maximum retention period less than the latest end of the minimum retention periods, preventing access to the data object after the earliest end of the maximum retention periods unless a user is also assigned to an area having an identified rule with a minimum retention period that has not elapsed and is granted authorization to access the area.

3. The method of claim 1, wherein, when the latest end of the minimum retention periods is less than the earliest end of the maximum retention periods, the data object is deleted at the latest end of the minimum retention periods.

4. The method of claim 1, wherein, when the latest end of the minimum retention periods is less than the earliest end of the maximum retention periods, the data object is deleted at the earliest end of the maximum retention periods.

5. The method of claim 1, wherein each period begins to elapse after an event specified in a time relevance field occurs.

6. The method of claim 5, wherein the event is a most recent change to the data object and each period is reset to begin elapsing each time the data object is changed.

7. The method of claim 5, wherein, at least one rule further includes a time offset field, the time offset field identifying an amount of time to postpone a start of each period associated with the at least one rule.

8. The method of claim 5, wherein each period and time field includes a unit of time identifier specifying a unit of time of each period.

9. The method of claim 8, wherein the time offset field includes an end of year unit of time resulting in a postponement of a start of each period associated with the at least one rule until an end of a fiscal or calendar year.

10. The method of claim 1, wherein the data object is deleted as soon as the latest end of the minimum retention periods elapses.

11. A non-transitory computer readable medium comprising stored instructions, that when executed by a processing device, cause the processing device to:
identify a plurality of data retention rules associated with a data object, each rule specifying an area to which the rule applies and at least one of a minimum retention period and a maximum retention period;
compare the minimum and the maximum retention periods in all of the identified data retention rules for the data object;
identify a latest end of the minimum retention periods and an earliest end of the maximum retention periods from the comparing for the data object;
if the latest end of the minimum retention periods for a single data object is less than the earliest end of the maximum retention periods, delete the data object no earlier than the latest end of the minimum retention periods and no later than the earliest end of the maximum retention periods; and
otherwise, if the latest end of the minimum retention periods is not less than the earliest end of the maximum retention periods, the stored instructions further cause the processing device to:
grant access to the data object for users granted authorization to access an area having a rule associated with the data object with a minimum retention period that has not yet elapsed when the maximum retention period in each respective rule is reached until the latest end of the minimum retention periods is reached;
otherwise deny access to the data object when the maximum retention period in each respective rule is reached until the latest end of the minimum retention periods is reached; and
delete the data object at the latest end of the minimum retention periods.

12. The non-transitory computer readable medium of claim 11, wherein the non-transitory computer readable medium is included as part of a data access system, the data access system coupled to a communication network through which the data access system is able to access the data object.

13. A non-transitory computer readable medium comprising stored instructions, that when executed by a processing device, cause the processing device to:
identify a plurality of data retention rules associated with a data object, each rule specifying an area to which the rule applies and at least one of a minimum retention period and a maximum retention period;
identify an earliest end of the maximum retention periods in the identified rules for the data object;
if the earliest end of the maximum retention periods has not elapsed, authorize user access to the data object if a user is authorized for the corresponding area;
otherwise, if the earliest end of the maximum retention periods has elapsed:
compare the area specified in each identified rule to a list of areas authorized for a user;
identify a subset of rules specifying areas authorized for the user;
if at least one of the identified subset of rules specifying areas authorized for the user also specifies a minimum retention period that has not elapsed, authorize user access to the data object until the specified minimum retention period has elapsed;
otherwise, deny user access to the data object; and
delete the data object at a latest end of the minimum retention periods specified in the identified plurality of data retention rules associated with the data object.

14. The non-transitory computer readable medium of claim 13, wherein the non-transitory computer readable medium is included as part of a data access system, the data access system coupled to a communication network through which the data access system is able to access the data object.

15. The non-transitory computer readable medium of claim 13, wherein user access to data objects is denied unless affirmatively authorized.

16. The non-transitory computer readable medium of claim 15, wherein the stored instructions are re-executed at the processing device each time an attempt is made to access a data object.

17. The non-transitory computer readable medium of claim 15, wherein each rule specifies only two time periods-a minimum retention period and a maximum retention period.

18. The non-transitory computer readable medium of claim 15, wherein each rule only includes (i) an area field specifying an area to which the rule applies, (ii) a minimum retention period field, and (iii) a maximum retention period field.

19. The non-transitory computer readable medium of claim 15, wherein at least one separate data source includes an association between areas to which each rule applies, users assigned to those areas, and data objects assigned to those areas.

* * * * *